United States Patent
Ihle et al.

(10) Patent No.: US 8,904,193 B2
(45) Date of Patent: Dec. 2, 2014

(54) METHOD FOR OPERATING A SECURITY DEVICE

(75) Inventors: Markus Ihle, Kusterdingen (DE);
Robert Szerwinski, Waiblingen (DE);
Oliver Bubeck, Pluederhausen (DE);
Jan Hayek, Munich (DE); Jamshid Shokrollahi, Stuttgart (DE)

(73) Assignee: Robert Bosch GmbH, Stuttgart (DE)

(*) Notice: Subject to any disclaimer, the term of this patent is extended or adjusted under 35 U.S.C. 154(b) by 193 days.

(21) Appl. No.: 12/951,786

(22) Filed: Nov. 22, 2010

(65) Prior Publication Data

US 2011/0145601 A1 Jun. 16, 2011

(30) Foreign Application Priority Data

Dec. 16, 2009 (DE) .................. 10 2009 054 753

(51) Int. Cl.
*G06F 11/30* (2006.01)
*G06F 21/79* (2013.01)
*G11C 7/24* (2006.01)

(52) U.S. Cl.
CPC . *G06F 21/79* (2013.01); *G11C 7/24* (2013.01)
USPC .......... 713/193; 713/165; 713/173; 713/176; 380/281; 380/284

(58) Field of Classification Search
CPC . G06F 21/60; G06F 21/78; G06F 2221/2141; G06F 21/6245; G06F 21/00; G06F 21/123; G06F 3/0679; G06F 21/6218; G06F 21/10; H04L 63/068; H04L 2463/062; H04L 9/0822; H04L 9/14; H04L 9/3281; H04L 9/00; H04L 9/08; G06Q 20/341; G06Q 20/355; H04N 21/6582

See application file for complete search history.

(56) References Cited

U.S. PATENT DOCUMENTS

| | | | |
|---|---|---|---|
| 2003/0097341 A1* | 5/2003 | Hans et al. ...................... | 705/71 |
| 2004/0015478 A1* | 1/2004 | Pauly .............................. | 707/1 |
| 2005/0005156 A1* | 1/2005 | Harper ........................... | 713/200 |
| 2005/0086471 A1* | 4/2005 | Spencer ......................... | 713/165 |
| 2006/0129824 A1* | 6/2006 | Hoff et al. ..................... | 713/176 |
| 2008/0063183 A1* | 3/2008 | Greco et al. .................... | 380/2 |
| 2008/0294914 A1* | 11/2008 | Lee et al. ........................ | 713/193 |
| 2009/0013196 A1* | 1/2009 | Ito et al. ........................ | 713/193 |
| 2009/0220090 A1* | 9/2009 | Savagaonkar et al. ........ | 380/277 |
| 2009/0256676 A1* | 10/2009 | Piccirillo et al. ............. | 340/5.65 |

OTHER PUBLICATIONS

Nader M. Rabadi et al., Privacy Protection among Drivers in Vehicle-to-Vehicle Communication Networks, 2007, IEEE, pp. 1-6.*
Klaus Veder et al., Smart Cards—Requirements, Properties, and Applications, 1998, IEEE, pp. 307-331.*

* cited by examiner

*Primary Examiner* — Luu Pham
*Assistant Examiner* — Hao Nguyen
(74) *Attorney, Agent, or Firm* — Kenyon & Kenyon LLP

(57) ABSTRACT

A method for operating a security device includes a microcontroller, a protected memory area, in which at least one item of protection-worthy information is stored, and a unit, the microcontroller being connected to the protected memory area via the unit, the at least one item of protection-worthy information being accessed by the microcontroller via the unit when the method is carried out.

5 Claims, 1 Drawing Sheet

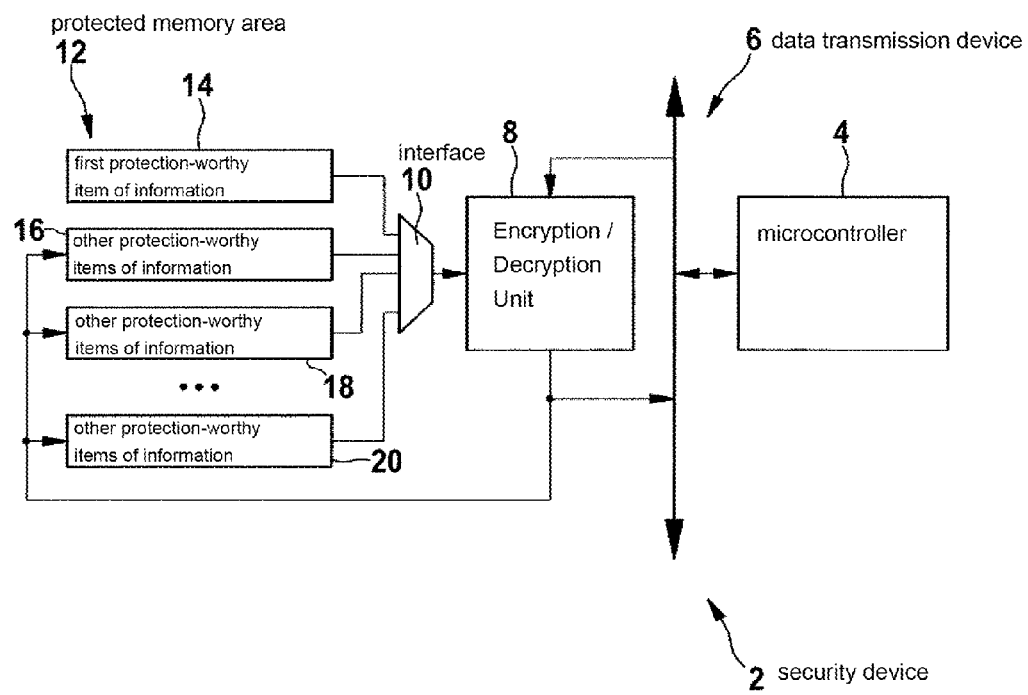

METHOD FOR OPERATING A SECURITY DEVICE

FIELD OF THE INVENTION

The present invention relates to a method for operating a security device and to a security device.

BACKGROUND INFORMATION

If it is generally provided to use a product which handles and/or includes sensitive and/or protection-worthy data in a non-secure environment, the sensitive data in the product must be protected against misuse.

In terms of the circuitry, the circuit must be designed or laid out in such a way that it has no error sources which a hacker may be able to use to access the sensitive information. At least two approaches are known for achieving this.

According to a first approach, a special circuit may be used which has a highly compact design and is engineered only for a specific purpose. The compact design, which is inexpensive to manufacture and may be easily kept free of errors, is suitable for this application. However, the occurrence of errors results in substantial additional costs, since a complete redesign is required. However, special circuits of this type remain state of the art at the time of their production. Since upgrades ordinarily exist, special circuits of this type usually have only a short service life; phone cards thus have an expiration date. Although the balance is not lost once the expiration date is reached, it must be transferred to a new phone card. Such an approach is therefore not suitable for long-lived products, such as for a control unit in a vehicle.

Furthermore, according to a second approach, so-called generic circuits are used which have a programmable microcontroller (μC) including a coprocessor, which is designed for processing sensitive data. In this case, errors are comparatively easy to remedy, since only the software has to be changed. Algorithms may also be changed by replacing software. To modify or check the software, however, it is necessary to access the circuit or a corresponding system. This access may be provided via a debug interface and thus via an interface for diagnosing errors.

However, the debug interface represents an additional source of errors and must itself be protected separately. The aforementioned generic circuit is also expensive, due to its complexity.

SUMMARY OF THE INVENTION

The present invention may be used, among other things, to maintain the secrecy of keys in debuggable hardware, i.e., hardware which may be used to diagnose, localize, and eliminate errors.

According to the present invention, it is also provided that a microcontroller (μC) within the security device is allowed to access protection-worthy information, for example keys, only in relation to a specific purpose.

A security device according to the present invention, i.e., a security module, may be integrated, for example, into a control unit for a vehicle. A special circuit, as described as the first approach according to the related art, is not suitable for this purpose, since the control units are in use for a very long period of time and it is not possible, in principle, to replace a special circuit of this type.

The generic circuit mentioned as the second approach according to the related art absolutely requires a debugging access for checking returns or to be able to even develop the software without excessively high costs. However, original equipment manufacturers (OEMs) who use the control units later on require Robert Bosch GmbH to be unable to read the keys out at a later time.

However, this conflicts with the concept of a generic, debuggable circuit, since full control of the microcontroller (μC) typically enables access to all data in the security device or in the system.

One way to prevent this is to strongly link the keys to be protected to their purpose, i.e., to the decryption and encryption of data, and to make it impossible to perform additional operations on the circuitry level.

The security device according to the present invention is designed to carry out all steps in the method provided. Individual steps in this method may also be carried out by individual components of the security device. Furthermore, functions of the security device or functions of individual components of the security device may be implemented as method steps. It is also possible to implement method steps as functions of at least one component of the security device or as functions of the overall security device.

BRIEF DESCRIPTION OF THE DRAWING

FIG. 1 shows a schematic representation of a specific embodiment of a security device according to the present invention.

DETAILED DESCRIPTION

The specific embodiment of a security device 2 according to the present invention, which is illustrated schematically in FIG. 1, includes a microcontroller 4 which is provided in this case via a data transmission device 6 designed as a bus and having a unit 8 for encrypting and/or decrypting data. This unit 8 may be designed, for example according to the Advanced Encryption Standard (AES), a symmetrical cryptography system. Unit 8 may be typically designed to carry out any symmetrical and/or at least partially asymmetrical encryption and/or decryption method. Via an interface 10, among other things, only unit 8 has access to a protected memory area 12 via which protection-worthy items of information 14, 16, 18, 20 designed in this case as keys are stored in registers provided for this purpose. A first protection-worthy item of information 14 is designed as main key "key_1." The other protection-worthy items of information 16, 18, 20 are designed as conventional keys "key_n1," "key_n2," "key_nk." All conventional keys "key_n1" through "key_nk" are designed to carry out cryptographic methods and thus to encrypt and decrypt data.

In the specific embodiment illustrated, main key "key$_{13}$ 1" is designed only to introduce new conventional keys into security device 2. Therefore, main key "key_1" may not be used to decrypt items of information 16, 18, 20 or corresponding data, such as payload data. In a further embodiment of the present invention, it may be provided that encrypting and/or decrypting items of information 16, 18, 20 or data is/are suppressed on a first level for keys derived directly from main key "key_1" and allowed only starting on a further level.

Within security device 2, microcontroller 4 is connected to encryption unit 8, which is designed as an encryption coprocessor, via the bus, any other connection also being possible. Microcontroller 4 is unable to directly access items of information 14, 16, 18, 20 designed as keys ("key_1," key_n1 through "key_nk") and required for encryption due to circuitry means. In the implementation described, there is no logical path from memory area 12 to microcontroller 4 past encryption unit 8.

If it is provided to encrypt or decrypt a datum using microcontroller 4, this is communicated to encryption unit 8 via a key index, for example: encrypt datum "important text" using key "key_nx."

However, microcontroller 4 may not write to main key "key_1," which may also be designated "ROM key." In the embodiment, it may be provided, without limiting security, to write directly only to conventional keys "key_n1" through "key_nk." However, it is ensured in this case that a key which was previously stored in the register may not be only partially overwritten or completely deleted before a write command is executed in this register.

It is typically provided that microcontroller 4 may not gain knowledge of the keys, which also applies to write operations. Writing/replacing a key is possible only in encrypted form. To replace a key, the key is first encrypted. Special main key "key_1" exists for this purpose. Once again, microcontroller 4 is prevented by circuitry means from using this main key to encrypt/decrypt data.

If a key, such as "key_n4," is to be replaced, this key is encrypted using main key "key_1." A block which is formed here (enc(key_1, key_n4new)) is transferred to microcontroller 4. Because it has no knowledge of main key "key_1," the microcontroller is unable to ascertain new key "key_n4new." The block is transferred to encryption unit 8 by microcontroller 4. Unit 8 may use main key "key_1" to decrypt the block and to overwrite key "key_n4" to be replaced with new key "key_n4new." A key is thus replaced, for example according to the protocol described here.

In a first variant of the specific embodiment described, main key "key_1" is created externally and introduced as an individual key at the end of the line during the manufacture of security device 2.

In a second variant, main key "key_1" may be modified if main key "key_1" is known. According to a third variant, main key "key_1" may be overwritten by any other known key or by another fixed known key. In this case, the keys also need a status indicator to show their validity (validity flag) or a "magic number" and thus a special value to demonstrate whether the key is valid or whether a corresponding register in memory area 12 or in the key memory is empty.

In the embodiment, microcontroller 4 is connected to memory area 2 only via unit 8 for encrypting and/or decrypting data. Due to this measure, microcontroller 4 may be prevented from writing directly to memory area 12 in which items of information 14, 16, 18, which are designed as keys, are stored within the registers. As an alternative or in addition, only limiting read access to memory area 12 may be provided.

What is claimed is:

1. A method for operating a security device which includes a microcontroller, a protected memory area in which a plurality of items of protection-worthy information are stored, and a unit for encrypting and/or decrypting data, the microcontroller being connected to the protected memory area via the unit, the method comprising:
   accessing at least one of the plurality of items of protection-worthy information by the microcontroller via the unit, wherein:
      the plurality of protection-worthy information include a plurality of keys of the security device, the plurality of keys including (a) at least one encryption/decryption key used for encryption or decryption of data and (b) a main key used for encryption or decryption of the at least one encryption/decryption key; and
      accessibility of the plurality of items of protection-worthy information by the microcontroller is only indirectly via the unit; and
   replacing the at least one encryption/decryption key with a new encryption/decryption key including:
      receiving at the microcontroller the new encryption/decryption key in encrypted form, wherein the new encryption/decryption key was encrypted using the main key; and
      transferring to the unit the encrypted new encryption/decryption key allowing the unit to decrypt the encrypted new encryption/decryption key to overwrite the at least one encryption/decryption key with the new encryption/decryption key.

2. The method according to claim 1, wherein, to encrypt or decrypt at least one datum, the microcontroller transfers a corresponding query to the unit via a key index, and the at least one datum is encrypted or decrypted by the unit using one of the plurality of keys of the protection-worthy information which is referenced by the key index.

3. The method according to claim 2, wherein, to export at least one item of protection-worthy information from the protected memory area, the at least one item of protection-worthy information is encrypted by the unit using one of the plurality of keys of the protection-worthy information, forming a block, the formed block being transferred to the microcontroller by the unit.

4. A security device comprising:
   a microcontroller;
   a protected memory for storing a plurality of items of protection-worthy information; and
   a unit for at least one of encrypting data and decrypting data, the microcontroller being connected to the protected memory area via the unit and being able to access at least one of the plurality of items of protection-worthy information via the unit, wherein:
      the plurality of protection-worthy information include a plurality of keys of the security device, the plurality of keys including (a) at least one encryption/decryption key used for encryption or decryption of data and (b) a main key used for encryption or decryption of the at least one encryption/decryption key;
      accessibility of the plurality of items of protection-worthy information by the microcontroller is only indirectly via the unit; and
      the security device is configured to:
         receive at the microcontroller a new encryption/decryption key in encrypted form, the new encryption/decryption key having been encrypted using the main key; and
         transfer to the unit the encrypted new encryption/decryption key allowing the unit to decrypt the encrypted new encryption/decryption key to overwrite the at least one encryption/decryption key with the new encryption/decryption key, wherein the receipt and transfer result in a replacement of the at least one encryption/decryption key with the new encryption/decryption key.

5. The security device according to claim 4, wherein the unit is configured to use the main key to encrypt and decrypt other keys of the protection-worthy information.

* * * * *